UNITED STATES PATENT OFFICE.

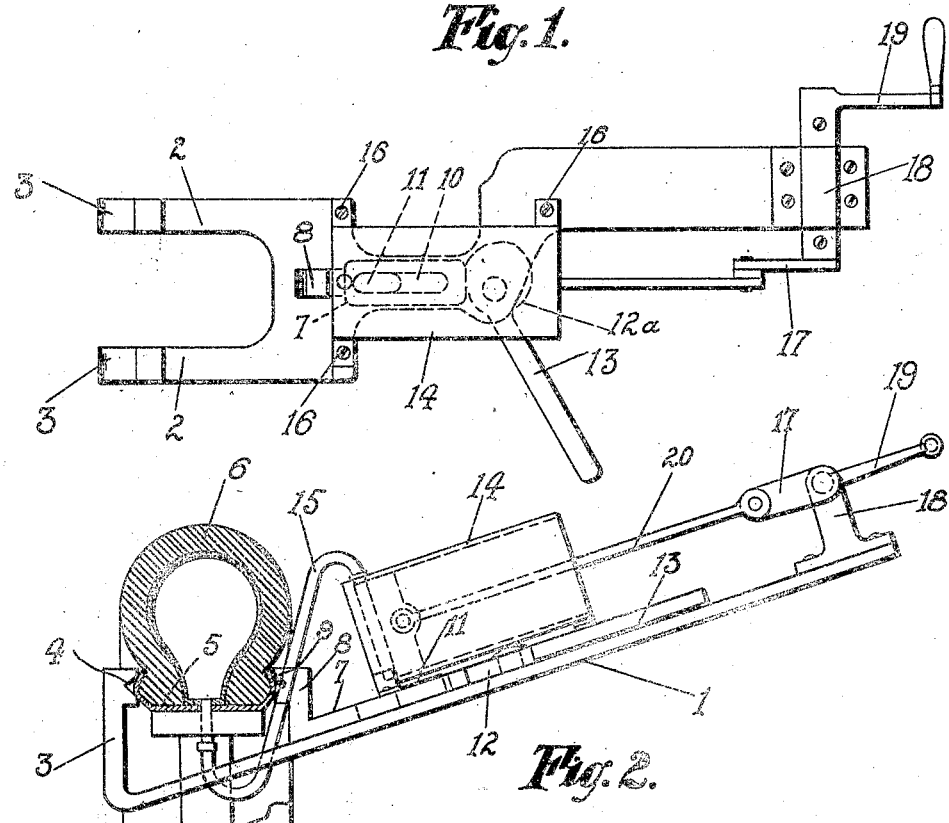

JOHN C. GILBERT, OF GRAFTON, MASSACHUSETTS.

PNEUMATIC-TIRE PUMP.

1,379,096.   Specification of Letters Patent.   Patented May 24, 1921.

Application filed June 9, 1920. Serial No. 387,632.

*To all whom it may concern:*

Be it known that I, JOHN C. GILBERT, a citizen of the United States, residing at Grafton, in the county of Worcester and Commonwealth of Massachusetts, have invented a new and useful Improvement in a Pneumatic-Tire Pump, of which the following, together with the accompanying drawings, is a specification.

The present invention relates to new and useful improvements in a pump for inflating pneumatic tires, such as are employed upon automobiles, bicycles and the like, and it has for its objects to provide a pump for this purpose which is compact, inexpensive in construction, and provided with means for its attachment to the rim of a wheel in convenient position to be easily operated. These objects I accomplish by the construction, combination and arrangement of parts as hereinafter described and shown in the accompanying drawings, in which—

Figure 1 is a top or plan view of my improved tire pump, and

Fig. 2 is a side elevation showing the method of its attachment to a wheel provided with a pneumatic tire.

Similar reference characters refer to similar parts in both figures.

Referring to the drawings, 1 denotes a support for the pump and its connected operating parts, said support consisting of a plate preferably shaped as represented in Fig. 1, one end of which is bifurcated forming the prongs 2, 2, upon the ends of which are formed fixed clamping jaws 3, 3, provided with V-shaped notches 4 at their upper ends adapted to engage the wheel rim 5 supporting a pneumatic tire 6. Mounted upon the pump support 1 is a slide 7, carrying upon one end a movable jaw 8 provided with a V-shaped notch 9 adapted to engage the wheel rim 5 upon the side opposite the jaw 3. The slide 7 is slotted at 10 to embrace a fixed elongated boss 11 projecting from the upper side of the pump support 1. Pivotally held upon the pump support 1 is a rotatable cam 12 contacting with the end of the slide 7 and provided with a lever handle 13, by which the cam 12 is rotated to crowd the slide 7 on the support 1 until the jaw 8 is brought into close contact with the rim 5 of the wheel. The cam 12 is suitably shaped to bring its "dead point" into contact with the slide 7 when the jaw 8 has been forced into position.

Mounted upon the support 1 is a piston equipped pump cylinder 14, constructed in all respects like the pump cylinders now in common use and, as it forms no part of my present invention, is not herein described in detail, it being sufficient for the purposes of this specification to describe the same as containing a suitably packed reciprocating pump cylinder with the usual and ordinary means for drawing air into the cylinder 14 as the piston is moved away from the wheel, and forcing air into the pneumatic tire through a flexible tube 15, in the same manner as this operation is accomplished in the well known type of pneumatic tire pumps. The pump cylinder 14 is attached by screws 16 to the support 1, and a reciprocating motion is imparted to the piston by means of a crank arm 17 journaled in a post 18 attached to the support 1 and carrying a hand crank 19. The crank arm 17 is connected with the reciprocating piston of the pump cylinder 14 by means of a connecting rod 20, pivotally attached to the piston by a wrist pin in the usual and well known manner.

The clamping jaw 8 is considerably shorter than the clamping jaw 3, so that when the support 1 has been attached to the bottom of the wheel by means of the jaws 3 and 8, the support 1 will stand at an oblique angle to the plane of the wheel, in order to bring the journaled hand crank 19 at a higher level than the top of the wheel, for convenience of operation.

I am aware that it has been proposed to clamp a pumping mechanism to the inside of the wheel felly upon opposite sides of the axis of the wheel. By my improved method of clamping the pumping mechanism to the wheel, I utilize the wheel rim for that purpose, thereby enabling tires carried upon demountable rims to be inflated whether said rims are on or off the wheel.

I claim,

1. The combination in a pneumatic tire pump, of a piston equipped pumping cylinder, a support for said cylinder, and means for clamping said cylinder support to a wheel at an oblique angle to the plane of the wheel.

2. In a pneumatic tire pump, the combination of a piston equipped pumping cylinder, a support for said cylinder, a fixed clamping jaw for engaging one side of a wheel rim, a movable jaw slidable on said support for engaging the opposite side of the wheel rim, and a rotatable cam held on said cylinder support for crowding said movable jaw against the wheel rim.

3. In a pneumatic tire pump, the combination of a piston equipped pumping cylinder, a support for said cylinder, means for clamping said support to the rim of a wheel at an angle to the plane of the wheel, and rotatable means held on said cylinder support for imparting a reciprocating movement to the piston in said pumping cylinder.

4. In a pneumatic tire pump, the combination of a piston equipped cylinder, a support for said cylinder, a fixed clamping jaw for engaging one side of a wheel rim, a movable jaw for engaging the opposite side of the wheel rim, and means for forcing said movable jaw toward the fixed jaw.

5. In a pneumatic tire pump, the combination of a piston equipped cylinder, a support for said cylinder provided with fixed and movable jaws for engaging opposite sides of a wheel rim, said jaws having notches for engaging the wheel rim, and means for forcing the movable jaw toward the fixed jaw.

JOHN C. GILBERT.